United States Patent [19]
Wentworth, Sr.

[11] 3,780,701
[45] Dec. 25, 1973

[54] WILDLIFE FEEDER

[76] Inventor: William M. Wentworth, Sr., 619 Clower, San Antonio, Tex. 43545

[22] Filed: Feb. 23, 1973

[21] Appl. No.: 335,100

[52] U.S. Cl.............. 119/51 R, 119/53.5, 119/54, 119/56 A
[51] Int. Cl............................................. A01k 5/00
[58] Field of Search............ 119/51 R, 52 R, 52 A, 119/53.5, 54, 56 A

[56] References Cited
UNITED STATES PATENTS
3,034,480  5/1962  French.............................. 119/56 A
3,083,687  4/1963  Slaven............................ 119/52 R X Primary Examiner—Louis G. Mancene
Assistant Examiner—J. N. Eskovitz
Attorney—John C. Stahl

[57] ABSTRACT

A wildlife feeder which includes a container with a bore in the bottom thereof, means in said container for directing the flow of feed toward a selected portion of said bottom, an annular member slidably mounted on said selected portion, and a rod pivotally mounted in said container, a portion of said rod adapted to pass through said annular member and said bore and terminate substantially below said container whereby feed carried in said container is dispensed through said annular member and said bore upon movement of said rod.

11 Claims, 16 Drawing Figures

PATENTED DEC 25 1973　　3,780,701

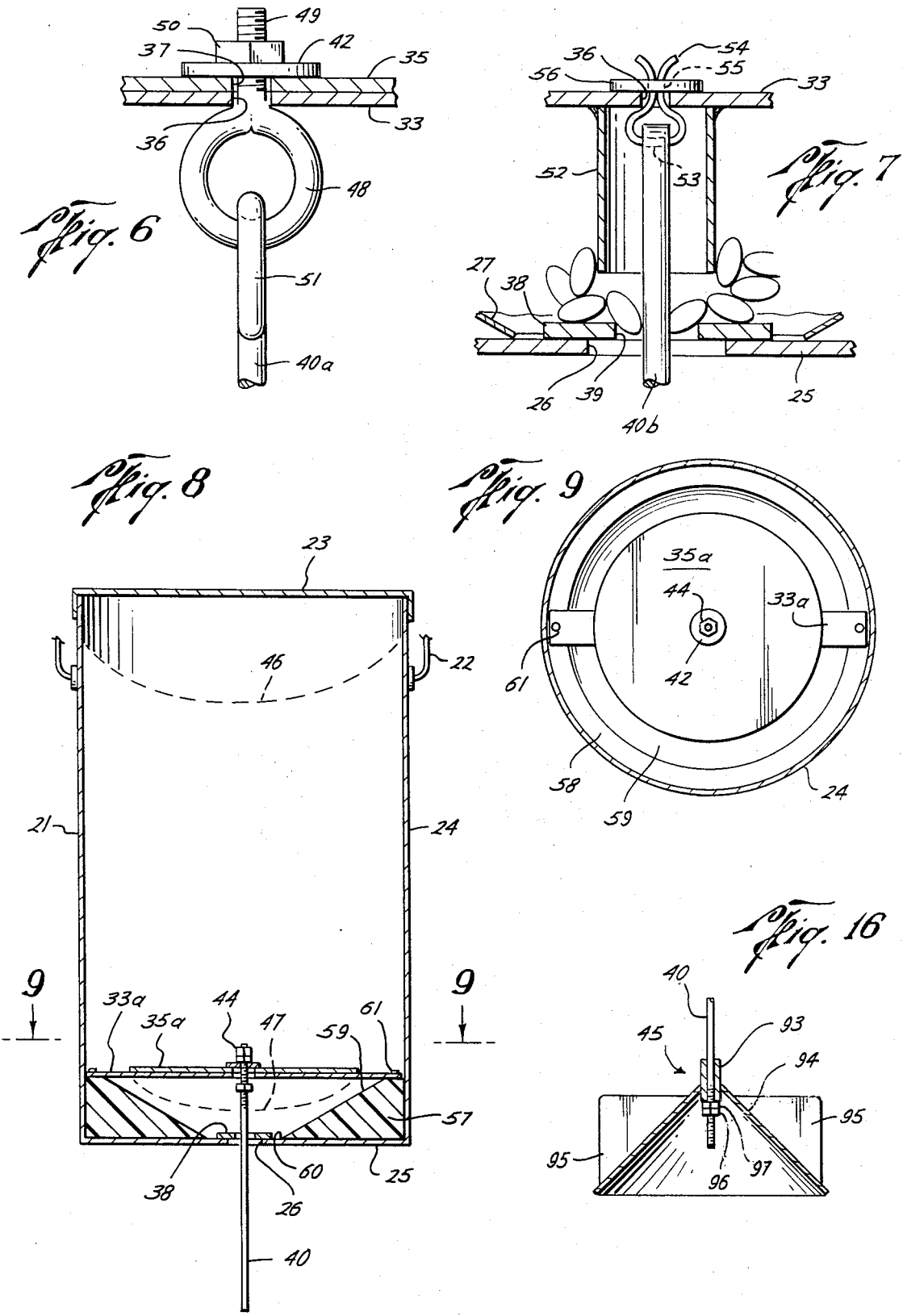

PATENTED DEC 25 1973 3,780,701

WILDLIFE FEEDER

BACKGROUND OF THE INVENTION

This invention relates generally to a wildlife feeder and more particularly to an improved wildlife feeder which meters feed grain-by-grain. In prior art game and wildlife feeders of this general type, the means for dispensing feed have generally been such that it is possible to exhaust the entire feed supply when the activating device is maintained in one position. Many of these feeders are also adapted to utilize only one type of feed, or alternatively, extensive and time consuming operations are required to adjust said feeders whereby a different type of feed may be utilized.

SUMMARY OF THE INVENTION

An object of this invention is the provision of a wildlife feeder which is maintained in elevated condition and which dispenses feed grain-by-grain.

Another object is to provide such a device wherein the means for dispensing or metering the feed may easily and conveniently be adjusted to provide a greater amount of feed, or alternatively, to utilize a different type of feed therein.

Still another object is to provide such a feeder which is simple in design, inexpensive to manufacture, efficient in operation, and relatively trouble free over extended periods of time.

Other objects and features of the invention will become apparent to those skilled in the art from a consideration of the following specification when read in the light of the annexed drawings.

BRIEF DESCRIPTION OF THE DRAWINGS

FIG. 6 is a fragmentary, greatly enlarged, side elevational view, partly broken away and partly in section, showing another means for pivotally mounting the rod of the subject invention.

FIG. 7 is a fragmentary, greatly enlarged, vertical sectional view, showing still another means for pivotally mounting the rod of the subject invention.

FIG. 8 is a vertical sectional view through the approximate medial plane of another embodiment of the invention.

FIG. 9 is a horizontal sectional view taken on the line 9-9 of FIG. 8 looking in the direction of the arrows.

FIG. 16 is a greatly enlarged, vertical sectional view through the approximate medial plane of a wind operated, feed deflector of the subject invention.

DETAILED DESCRIPTION OF THE INVENTION

Figure 1:
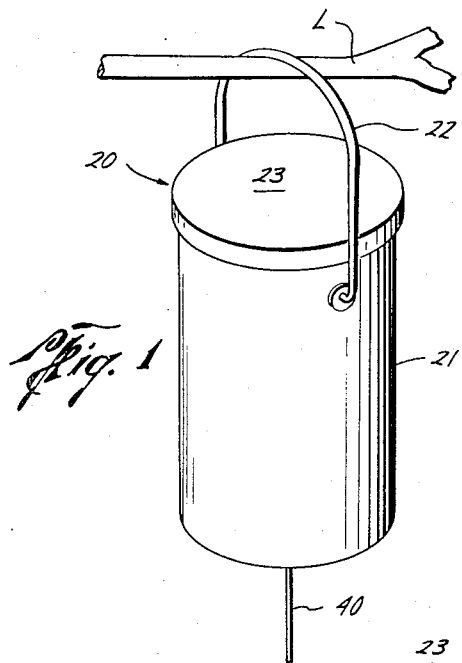
FIG. 1 is a perspective view of a preferred embodiment of wildlife feeder of the subject invention.

Referring now to the drawings, wherein like reference characters designate like or corresponding parts throughout the several views, there is shown in FIG. 1 a preferred embodiment of wildlife feeder 20 of the subject invention comprising, in general, a cylindrical container 21 of desired capacity with a bale 22 pivotally secured thereto in a conventional manner. Desirably a cover or lid 23 is adapted to be detachably secured to the upper portion of said container. Feeder 20 is normally secured in elevated condition by passing bale 22 over the limb L of a tree or the like.

Figure 2:
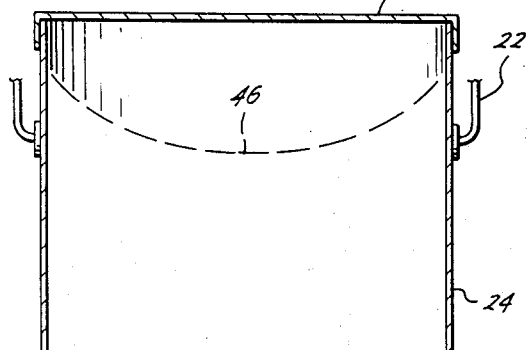
FIG. 2 is an enlarged, vertical sectional view through the approximate medial plane of the embodiment of FIG. 1.
Figure 3:
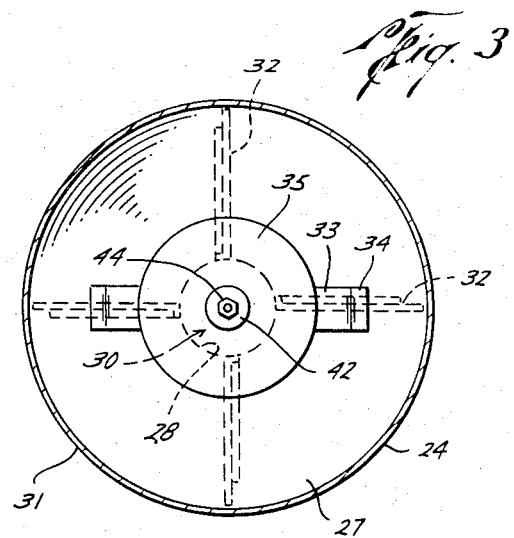
FIG. 3 is a horizontal sectional view taken on the line 3—3 of FIG. 2 looking in the direction of the arrows.

Container 21, of metallic or plastic composition, includes cylindrical side walls 24 with circular bottom 25 conventionally secured to the lower portions thereof; vertical bore 26 is provided in the approximate center of said bottom. As best seen in FIGS. 2 and 3 of the drawings, truncated cone 27 is supported in the lower portion of said container; more specifically, said cone terminates downwardly in a reduced diametral opening 28 bounded circumferentially by lower rim 29 which is adapted to bear against the bottom of said container. Opening 28, substantially greater in diameter than bore 26 heretofore mentioned, defines a circular area 30 on the bottom of said container. The upper rim 31 of said cone desirably bears against the inner side walls of said container in a relatively tight fit. A plurality of vertically and radially extending legs 32, conventionally secured to selected outer portions of said cone and adapted to bear against the bottom of said container, additionally support said cone.

Horizontally extending strap 33 terminates laterally in angularly upwardly extending flanges fixedly secured to the approximate medial, inner wall surfaces of said cone. Disc 35, of lesser diameter than the corresponding diameter of the cone along the corresponding horizontal plane, is fixedly secured to strap 33 with axial and vertically aligned bores 36-37 (see FIG. 6) passing through said strap and disc, respectively. As will hereinafter be described in detail in connection with FIGS. 4-5 of the drawings, flat annular member 38 of lesser diameter than area 30 and supported thereon includes bore 39 of desired diameter. The threaded upper end of an elongated rod 40 carries stop nut 41 and is passed upwardly through bores 36,37 and thence through washer 22 carried on the upper surface of said disc; jamb nuts 43-44 are threaded on said rod in proximity to the upper end thereof. The lower end of rod 40 is passed downwardly through bores 39,26 and terminates substantially below feeder 20; brush (not shown) or deflector 45, hereinafter to be more fully described in connection with FIG. 16 of the drawings, may be secured to a selected portion of said rod downwardly of said container.

It is to be understood that feed is to be metered through bore 39 of annular member 38. Accordingly, a plurality of annular members 38 having bores ranging from approximately one-eighth to one-fourth inch are normally provided for use with feeds of different size and shape. The user selects a member 38 having a bore which is sufficiently large to accommodate rod 40 and permit passage of grains of feed in at least one position of said rod relative to said bore.

Jamb nuts 43,44 are first removed from the upper end of rod 40 after which said rod may be passed downwardly through bore 26; the selected member 38 is then placed on circular area 30 and the upper end of said rod passed upwardly through bores 26,39 and thence bores 36,37 and nuts 43,44 replaced. It is understood that stop nut 41 carried on rod 40 is desirably of lesser diameter than bore 26 in the bottom of said container, but said stop nut 41 is at least slightly greater in diameter than bore 36 in strap 33 whereby the upper end of said rod may not be displaced by an animal or other upward force applied to either said rod or to the container.

Any desired quantity of feed may then be placed within container 21, indicated by reference numeral 46. Since the feed passes downwardly and circumferentially around disc 35, flow is partially regulated by the diameter of said disc relative to the corresponding diameter of said cone; furthermore, said disc controls the level of feed downwardly thereof, indicated by reference numeral 47, whereby binding of rod 40 is minimized. The user may select an annular member including a larger or smaller bore when it is desired to dispense either a greater or lesser amount of feed, respectively.

Figure 4:
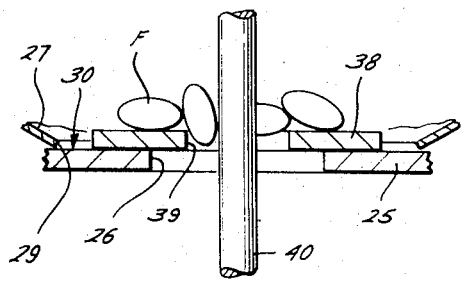
FIG. 4 is a fragmentary, greatly enlarged, vertical sectional view showing the means for metering feed in each of the embodiments of the subject invention.
Figure 5:
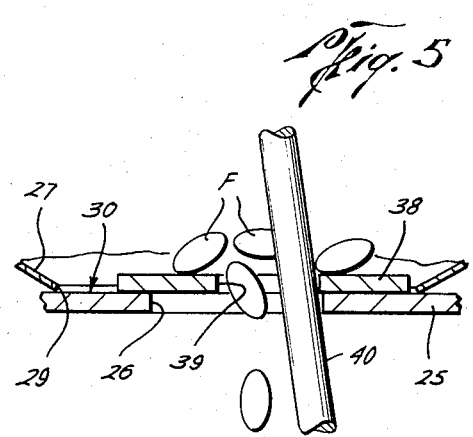
FIG. 5 is a fragmentary, greatly enlarged, vertical sectional view showing the means for metering feed, wherein said feed is dispensed grain-by-grain.

In operation, the pivoting action of rod 40 causes member 38 associated therewith to slide about circular area 30 until stopped by rod 40 bearing against the side of bore 26. As heretofore mentioned, the position of rod 40 within bore 39 controls the passage or flow of feed therethrough. As shown in FIG. 4 of the drawings, the position of rod 40 prevents the individual grains of feed F from passing downwardly through bore 39. When rod 40 is pivoted, as shown in FIG. 5, feed is metered grain-by-grain through said bore. Furthermore, movement of member 38 about circular area 30 agitates the grains thereby preventing stoppages and aiding in dispensing the feed.

Referring now to FIG. 6, there is shown another means for pivotally connecting rod 40a to strap 33. More particularly, eye 48 includes stud 49 which is passed upwardly through bores 36-37 and washer 42 with nut 50 threaded onto said stud. The uppermost end of rod 40a is provided with a hook 51 which is adapted to pass through eye 48.

There is shown in FIG. 7 of the drawings another means for pivotally connecting the upper end of rod 40b to strap 33. A downwardly depending cylinder 52 which terminates slightly above member 38 is fixedly secured as by welding or the like to the medial portion of the undersurface of strap 33. The upper portion of rod 40b includes a transversely extending bore 53 through which cord 54 is passed. The ends of said cord are passed upwardly through bore 36 and thence through an axial bore 55 in disc 56 or the like.

Referring now to FIGS. 8–9 of the drawings, there is shown a modification of the embodiment of FIGS. 1–3 wherein a generally cylindrical member 57 is inserted into the lower portion of container 21 in a relatively tight fit. Member 57 is desirably composed of plastic and includes a circumferentially disposed and horizontally extending shoulder 58 about concentric cone 59, said cone terminates downwardly in opening 60 substantially greater in diameter than bore 26 in the bottom of said container. Flat strap 33a is secured to shoulder 58 by means of screws 61 or the like passed downwardly through bores (not shown) in each end of said strap into said shoulder. Disc 35a is secured to the medial portion of said strap and the upper end of rod 40 pivotally connected to said strap and disc in the manner heretofore described.

Figure 10:
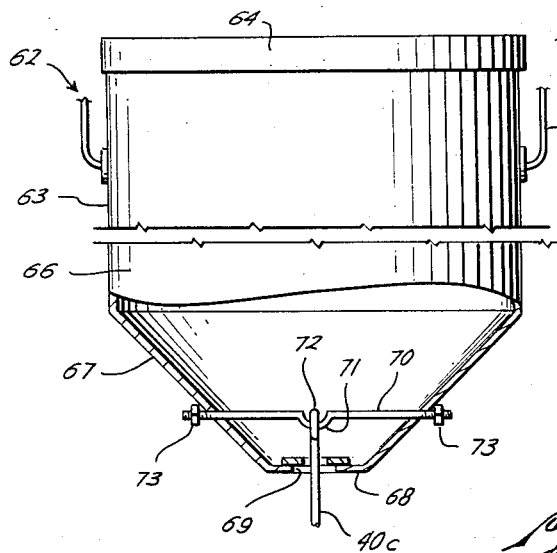
FIG. 10 is a side elevational view, partly broken away and partly in section, of still another embodiment of the invention.
Figure 11:
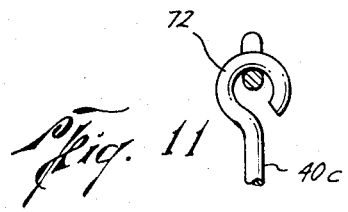
FIG. 11 is a greatly enlarged side elevational view of the means for pivotally mounting the rod in the embodiment of FIG. 10.

There is shown in FIGS. 10 and 11 another embodiment of feeder 62 constructed in accordance with the principles of the invention comprising container 63, lid 64, and bale 65. The upper portion of container 63 includes cylindrical side walls 66 whereas the lower portion of said container includes conical side walls 67 and integrally formed bottom 68 with axial bore 69 provided therein. Horizontally extending rod 70 includes an upwardly opening bight 71 in the medial portion which accommodates hook 72 provided on the upper end of rod 40c. The remote ends of rod 70 are threaded, adapted to pass through aligned bores (not shown) in the approximate medial portion of conical side walls 67 with a nut 73 threaded thereon outwardly of the respective walls.

Figure 12:
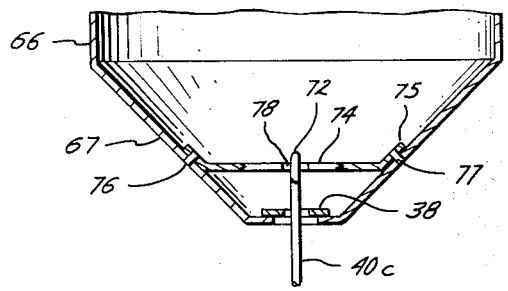
FIG. 12 is a fragmentary, vertical sectional view through the approximate medial plane of the lower portion of still another embodiment of the invention.
Figure 13:
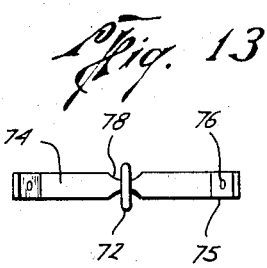
FIG. 13 is a top plan view showing the means for pivotally mounting the rod in the embodiment of FIG. 12.

In the modification of FIG. 12, strap 74 terminates laterally in angularly upwardly extending flanges 75 with perpendicularly extending studs 76 secured thereto which are adapted to insert into aligned bores 77 in the approximate medial portion of conical side walls 67. Obviously a nut (not shown) may be threaded onto the end of each stud. A reduced portion 78 in the medial portion of strap 74 accommodates hook 72 heretofore described in connection with FIG. 11 of the drawings.

Figure 14:
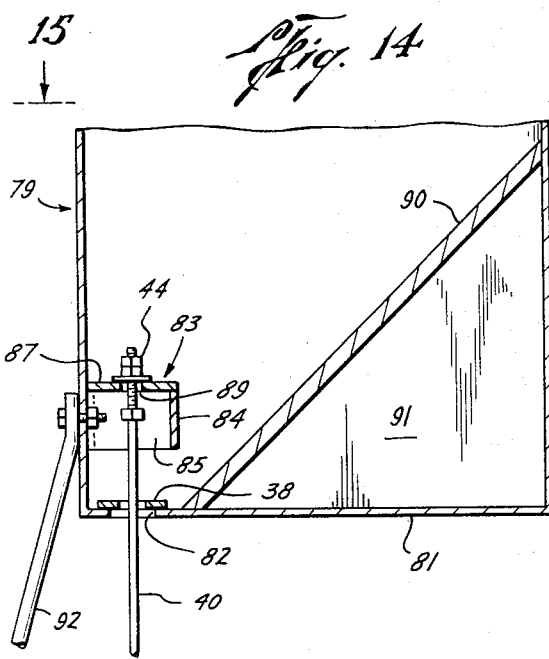
FIG. 14 is a fragmentary, vertical sectional view of still another embodiment of the invention.
Figure 15:
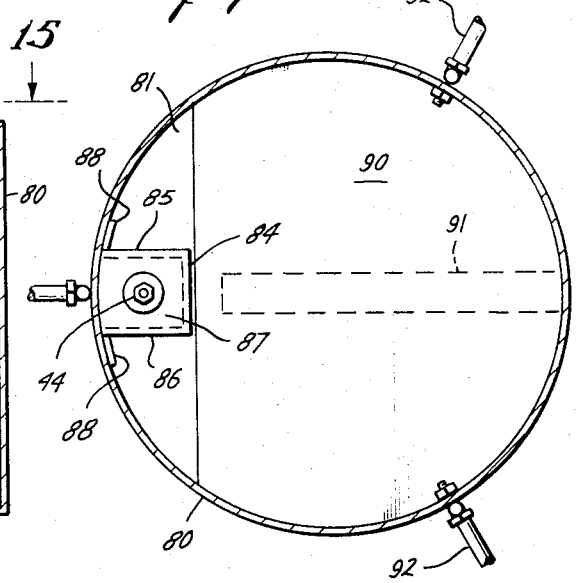
FIG. 15 is a horizontal sectional view taken on the line 15—15 of FIG. 14 looking in the direction of the arrows.

There is shown in FIGS. 14 and 15 of the drawings feeder 79 comprising, in part, a container of desired capacity with cylindrical side walls 80 and bottom 81 provided with a vertical bore 82 in proximity to the side walls of said container. Downwardly opening bracket 83 comprises front 84, sides 85–86, top 87 and laterally extending flanges 88 whereby said bracket is secured to side walls 80 approximately vertically above bore 82. Bore 89 is provided in the approximate center of top 87 of said bracket and the upper end of rod 40 is mounted in said bracket in the manner heretofore described in detail in connection with FIGS. 2–3 of the drawings. An angularly downwardly extending plate 90 including vertically extending support 91 which is adapted to at least partially bear against bottom 81 is positioned in the lower portion of feeder 79 in such a manner that feed is directed toward bore 82. Feeder 79 thus formed is normally maintained in elevated condition by means of a plurality of essentially vertically extending legs 92 of desired length which are conventionally secured to said container.

As heretofore mentioned, deflector 45 of FIG. 16 may be secured in proximity to the lower end of rod 40 in each of the embodiments of the invention. More particularly, deflector 45 comprises a cylindrical member 93 with the apex of an inverted cone 94 fixedly secured thereto. A plurality of vertically and radially extending vanes 95 are secured to the outer surface of cone 94. In use, the threaded lower end of rod 40 is passed through cylindrical member 93 with jamb nuts 96–97 threaded thereon adapted to bear against the lower end of said cylindrical member. Wind impinging upon vanes 95 causes rod 40 to pivot thereby dispensing grains of feed in the manner heretofore described. The grains of feed, upon striking the outer surface of cone 94, are deflected outwardly thereby increasing the radius of distribution of said feed.

It is to be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. In a wildlife feeder adapted to be suspended in elevated condition, the combination of a container including side walls and a bottom, a vertical bore in said bottom, a shaped member supported in said container, an opening in said shaped member substantially greater in diameter than said bore, an annular member including a bore slidably positioned on said bottom, an elongated rod pivotally mounted in said container, said rod passing through said bore in said annular member and said bore in said bottom and terminating downwardly of said container.

2. The invention of claim 1 wherein feed is dispensed through the bore in said annular member and the bore in said bottom by means of movement of said rod.

3. The invention of claim 1 wherein said shaped member at least partially includes a conical portion coaxial with said bore in said bottom.

4. The invention of claim 1 further including an essentially horizontally extending strap, a disc secured to said strap whereby grain is directed downwardly around said disc toward said opening in said shaped member.

5. The invention of claim 1 further including an essentially horizontally extending strap, a downwardly opening cylinder secured to the medial portion of said strap, said elongated rod at least partially extending through said cylinder and pivotally connected to said strap.

6. The invention of claim 1 including a wind operated deflector secured to said rod downwardly of said container whereby grains of feed are deflected outwardly.

7. In a wildlife feeder adapted to be suspended in elevated condition, the combination of a container including side walls and a bottom, a vertical bore in said bottom, a conically shaped member supported in said container, said shaped member terminating downwardly in an opening coaxial with and substantially greater in diameter than said bore, an annular member including a vertical bore slidably positioned on said bottom, an essentially horizontally extending support mounted in said shaped member, an elongated rod pivotally connected to said horizontally extending support, said rod at least partially extending through said bore in said annular member and said bore in said bottom and terminating downwardly of said container whereby movement of said rod meters grain through said bores in said annular member and said container.

8. In a wildlife feeder adapted to be suspended in elevated condition, the combination of a container including side walls and a bottom, a vertical bore in said bottom, an annular member including a vertical bore slidably positioned on said bottom, an elongated rod pivotally mounted in said container, said rod extending through said bore in said annular member and said bore in said bottom and terminating downwardly of said container whereby movement of said rod meters feed through said bore in said annular member and said bore in said bottom.

9. The invention of claim 8 including means in said container to direct the flow of feed toward said bore in said bottom.

10. The invention of claim 8 wherein said bore in said bottom is in proximity to said side wall, and a bracket secured to said side wall approximately vertically above said bore in said bottom, said rod pivotally connected to said bracket.

11. The invention of claim 8 including means secured to said rod downwardly of said container to deflect grains of feed outwardly.

* * * * *